April 28, 1931.  C. ADLER, JR  1,803,289
SYSTEM FOR AUTOMATICALLY CONTROLLING THE SPEED OF AUTOMOBILES
Filed July 28, 1926  3 Sheets-Sheet 1

INVENTOR
Charles Adler Jr.
BY
Charles B. Mann Jr.
ATTORNEY

April 28, 1931. C. ADLER, JR 1,803,289
SYSTEM FOR AUTOMATICALLY CONTROLLING THE SPEED OF AUTOMOBILES
Filed July 28, 1926 3 Sheets-Sheet 2

INVENTOR
Charles Adler Jr.
BY
Charles B. Mann Jr.
ATTORNEY

April 28, 1931.  C. ADLER, JR  1,803,289
SYSTEM FOR AUTOMATICALLY CONTROLLING THE SPEED OF AUTOMOBILES
Filed July 28, 1926    3 Sheets-Sheet 3

INVENTOR
Charles Adler Jr.
BY
Charles B. Llauer Jr.
ATTORNEY

Patented Apr. 28, 1931

1,803,289

UNITED STATES PATENT OFFICE

CHARLES ADLER, JR., OF BALTIMORE, MARYLAND, ASSIGNOR TO THE ADLER SAFETY CONTROL COMPANY, OF BALTIMORE, MARYLAND, A CORPORATION OF MARYLAND

SYSTEM FOR AUTOMATICALLY CONTROLLING THE SPEED OF AUTOMOBILES

Application filed July 28, 1926. Serial No. 125,552.

This invention relates to a system for automatically controlling the speed of automobiles on trackless highways.

The object of the invention is to provide an automobile with a mechanism that may automatically be actuated by a mechanism located at dangerous places on a highway whereby to cause an automatic reduction in the speed of an automobile if the speed of the latter is greater than a prescribed or predetermined speed during the passage of said automobile at said place of danger.

The present invention involves a control means on the automobile together with a speed governor and a means also on the vehicle which is operated by a magnetic means arranged on the highway whereby to actuate the control means and automatically reduce the speed until a predetermined reduced speed of the automobile shall have been effected but permit the automobile to proceed at or below such reduced speed.

The invention of the present application also involves a mechanism wherein the conrol means, after having been operated because of excessive speed at the approach to or upon entering a danger zone, will be automatically restored as the automobile leaves said danger zone so that the operation of operating the control means and reducing the speed to a predetermined speed and then the restoration of the control means to a normal condition as the danger zone is passed, will all be automatically effected and without regard to any action which the driver of the automobile may take.

While in the present application I disclose a highway element, and some of the claims herein are based on the cooperation of the vehicle devices with said highway element, claims to the highway means are not included herein but are to form the subject of a separate application for patent.

The accompanying drawings illustrate one form of apparatus and circuits for carrying the invention into practical operation, but it is to be understood that the invention is not to be defined or limited to the structure or circuits herein disclosed.

In the drawing,—

Fig. 4 illustrates a cross-sectional detail through the highway at one of the highway elements, and Fig. 5 shows diagrammatically an intersection of a highway with a railroad crossing and an arrangement of highway magnets.

Figure 1:
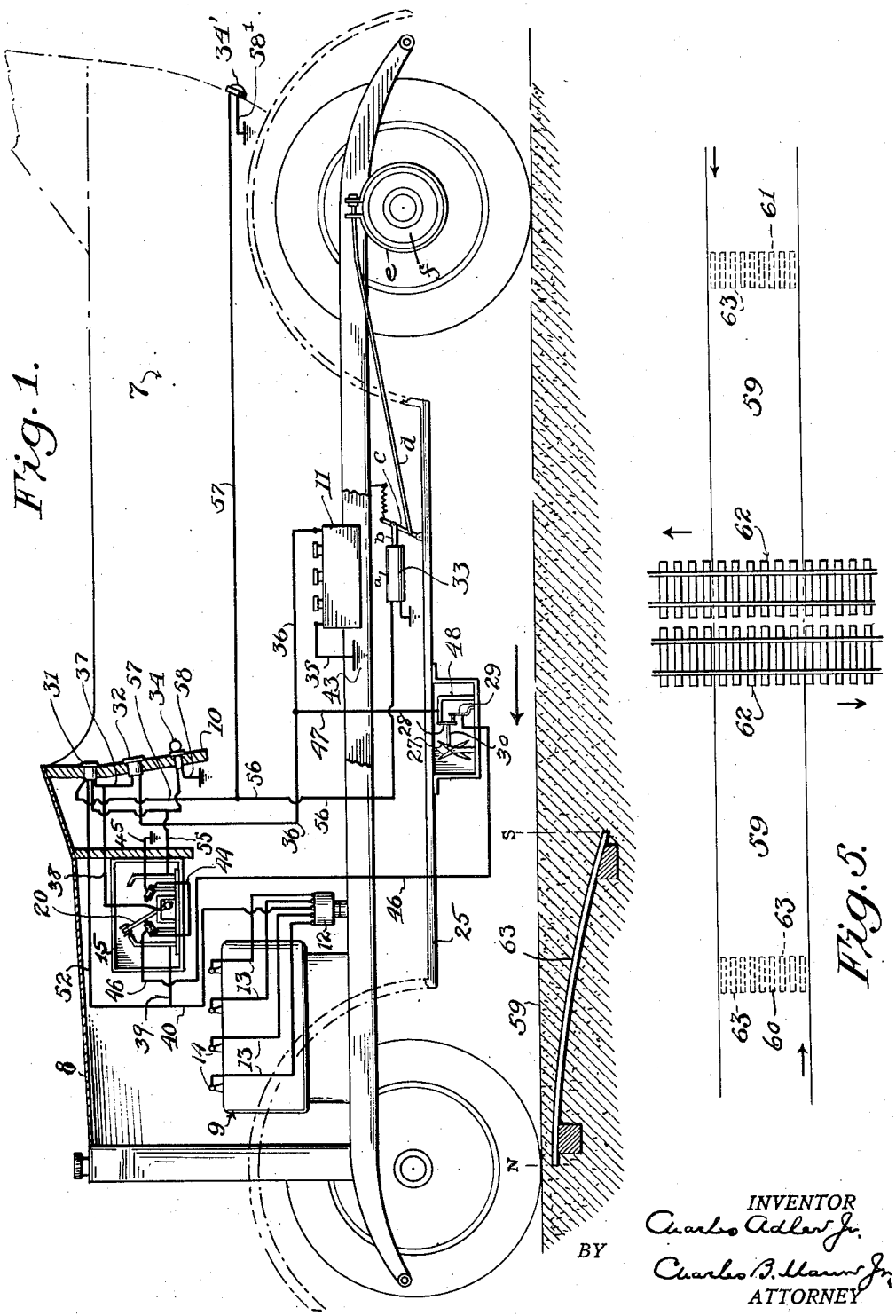
Fig. 1 shows in a diagrammatic way a sectional elevation of automobile; illustrating an arrangement of elements and circuits thereon for carrying out the present invention, and also illustrates a longitudinal section through a portion of the highway with the highway element embedded therein.

In the present illustration of the invention, the numeral 7 designates the body of an automobile; 8 the hood which covers the engine or motor 9, and 10 designates the instrument-board or dash.

The usual battery 11 is employed as is also a distributor 12 having connections 13 with the several spark-plugs 14 of the motor 9.

In the present disclosure, I provide a means on the automobile which is actuated by a stationary highway element in the trackless highway as the latter is passed, and by this actuation, I prevent the driving of the automobile above a predetermined speed until another stationary highway element is passed. When this other highway element is passed, the means on the automobile will be automatically reset and the automobile may then be operated at speeds above the predetermined low speed.

The highway elements are entirely separate and independent of each other in that they have neither mechanical or electrical connection one with another and each highway element is preferably at all times in an operative or energized condition.

The structure is entirely automatic in that it is actuated to reduce speed and then reset to permit unlimited speed without calling upon the driver of the automobile to manually cooperate, so that continuous control throughout dangerous zones along the trackless highway is automatically provided.

To effectively accomplish these results, I prefer to provide a case 15 on the automobile in which certain elements or apparatus may be placed and sealed and in the present disclosure, I show this case beneath the hood 8.

In this case 15, I locate two electro-magnets 16 and 17 respectively and associated with the magnet 16, I provide a contact-bar 18 while a similar bar 19 is associated with the electro-magnet 17.

Between the two electro-magnets 16 and 17, I locate a pendulum-like bar 20 on which there are side contacts 21 and 22 respectively, which contacts are so located that when the pendulum-bar is tilted in one position, the contact 21 will engage contact-bar 18 and when said pendulum-bar is swung to its other position, the contact 22 of said bar 20 will engage the contact-bar 19.

The pendulum-bar 20 in this instance is mounted in a bearing bracket 23 between its two ends and the lower end of this bar 20 is preferably provided with an adjusting weight 24, in order that it may be properly balanced to enable it to swing by gravity from the core of one electro-magnet to the core of the other electro-magnet between which magnets said bar will be moved.

In addition to the selective relay which includes the pendulum-bar and the two electro-magnets 16—17 which control it, I make use of an impulse breaker element which I also carry on the automobile and which is actuated by the independent highway elements as each of the latter is passed.

This breaker element may be attached to the automobile at any convenient place such as at the inner side of one of the front wheels or beneath the running board 25.

I prefer to make this attachment to something that is sustained by the springs, such as the body and things carried thereby, because such attachment relieves the breaker element of undue shocks and needless vibrations which it would receive if carried by the axles for example.

Figure 2:
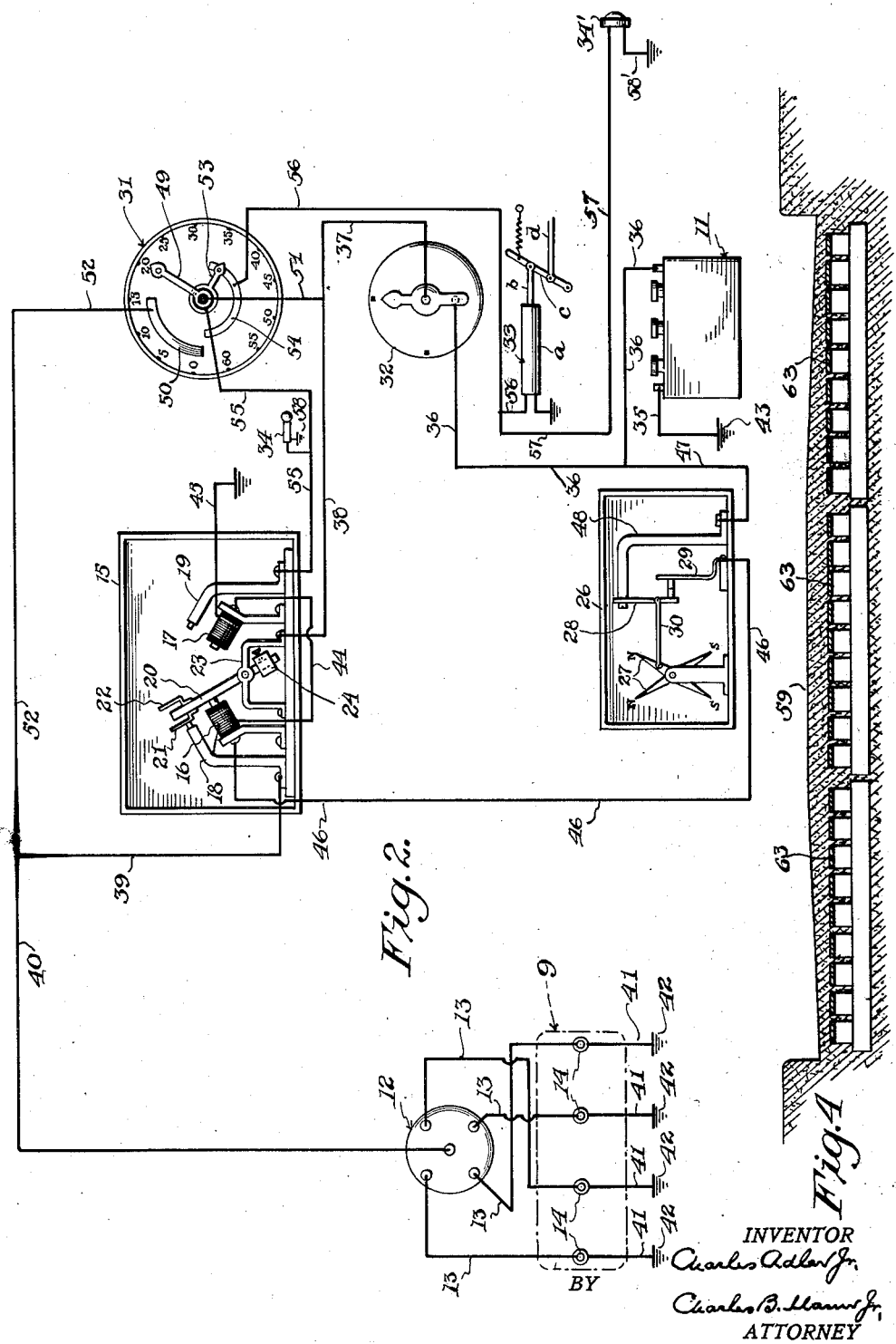
Fig. 2 illustrates, on an enlarged scale, the apparatus and circuits on the automobile said devices and circuits being in the normal condition.
Figure 3:
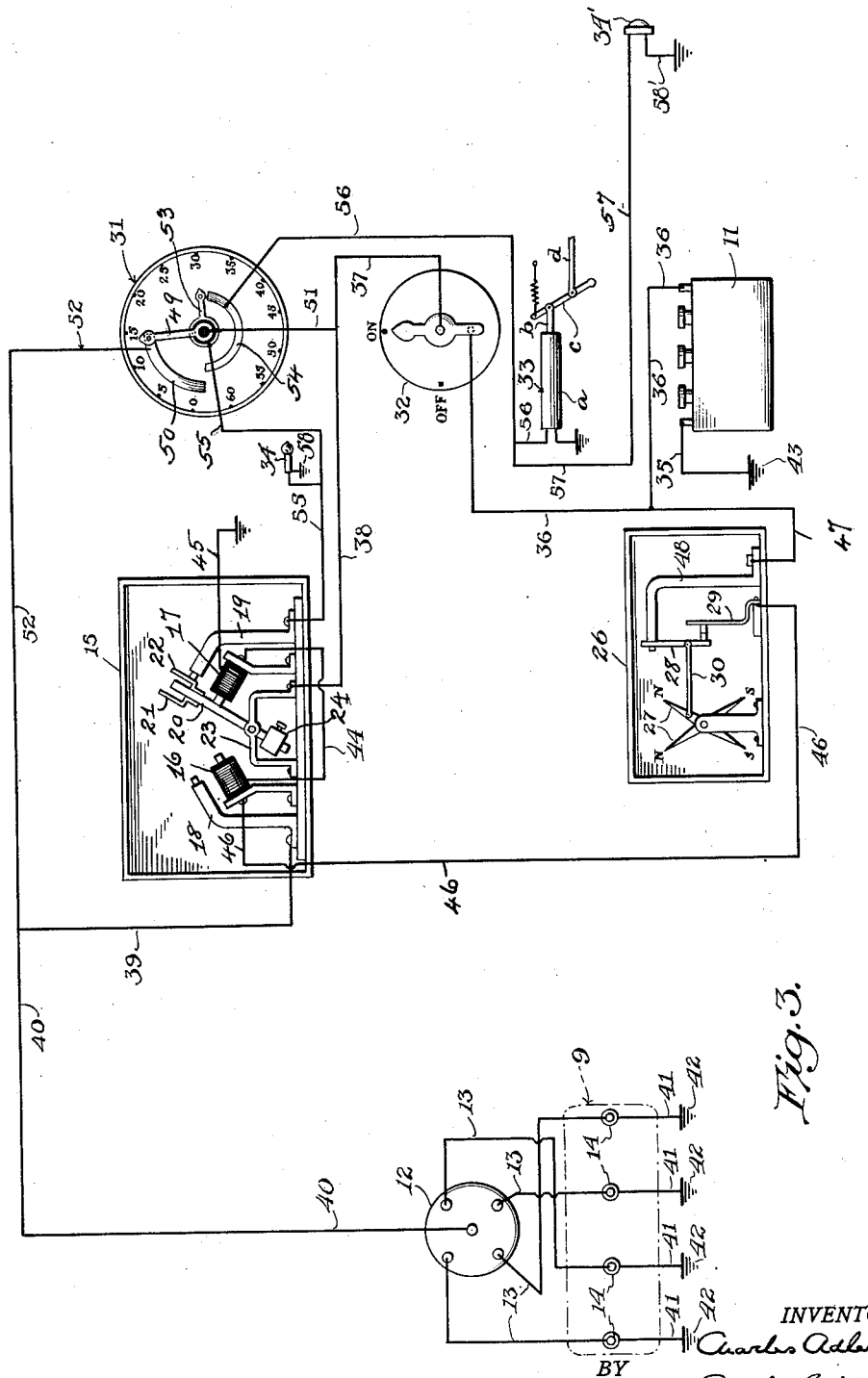
Fig. 3 shows the same but with the parts and circuits in the operated position to prevent a speed above a predetermined low speed.

In this instance, I therefore show the breaker-device mounted in a case 26 which is carried beneath the running-board 25 and by reference to Figs. 1, 2 and 3 of the drawings, it will be seen that this breaker-device in the present instance, includes a pivotally-sustained magnetic needle-bar device 27 and two contact plates 28 and 29,—the needle-bar device 27 being connected by a link 30 with one of the contact plates so that when the needle-bar is momentarily oscillated, it will instantly separate the contact-plates 28 and 29.

In addition to the selective relay, which includes the electro-magnets 16—17 and the pendulum-bar 20, and the devices 27—28—29 of the impulse breaker element, I also use a speed governor 31; an ignition switch 32, and preferably a brake mechanism 33 and a signal lamp 34 all of which are diagrammatically illustrated in Figs. 2 and 3 of the drawings.

The brake mechanism in this instance is shown diagrammatically as a solenoid, $a$, having a plunger-rod, $b$, which connects with a lever $c$, and a brake rod $d$, having one end attached to lever $c$ while its other end is connected to the brake bands $e$, around the brake-drum $f$.

Having described the mechanical structures of the elements involved, I will now proceed to explain the circuits for effecting an operation of those elements on the vehicle.

As is common practice in automobile wiring installations, the battery 11, has one side or terminal grounded to the automobile frame, as for example by a wire 35.

From the other post or terminal, I run a wire 36 to the ordinary ignition-switch 32, which is usually carried on the dash or instrument-board 10.

From the ignition-switch 32, there are wires 37—38 that lead to and connect the bracket bearing 23, which carries the pendulum-bar 20 so that the pendulum-bar will be included in any circuit that includes the wire 38.

When the pendulum-bar 20 is attracted by the electro-magnet 16, as shown in Fig. 2, its contact-plate 21, will engage contact bar 18 and from the bar 18 there extend wires 39 and 40 which latter wire connections, in this instance, connect with the distributer 12 of the motor.

It will thus be understood that the battery 11, will have a connection through the ignition switch 32, pendulum-bar 20, contact-bar 18, to the distributer 12 as long as the pendulum-bar is held by magnet 16, as shown in the normal circuit condition in Fig. 2, so that the ordinary operations of the ignition circuit may be carried on between the battery and the spark-plugs 14 of the motor 9.

Thus, under the conditions illustrated in Fig. 2, the automobile may be driven at any desired speed.

The return circuit from the motor 9 to the battery 11 is indicated by the wire 41, the grounds 42 and 43 and the ground wire 35 back to the battery.

It will be noted that the coils of the two magnets 16—17 are connected by wire 44; that magnet 17 has a ground connection 45 and that from magnet 16 there is a wire 46 that leads to and connects with the contact plate 29 of the breaker device.

Another wire 47 connects the main battery wire 36, with the bracket 48 that carries the contact plate 28, which the magnetic needle-bar device 27, momentarily actuates each time a highway device is passed.

It has been pointed out that as long as electromagnet 16 is energized with the pendulum-bar 20 attracted thereto the main ignition circuit from battery 11 to the distributer 12, and spark plugs 14 will be closed between the contact plate 21 and contact-bar 18. The energization of electro-magnet 16, however is controlled through the breaker device,—the circuit being from battery 11, by wires 36—47 to and through bracket 48 and contact-plate 28 to plate 29; then by wire 46 to and through the coil of magnet 16; then by wire 44 to and through the coil of the other electro-magnet 17 and finally by wire 45 to ground and back to the battery.

It will thus be seen both electro-magnets 16—17 are energized, in the form of apparatus herein disclosed, as long as contact-plates 28—29 are engaged but immediately upon the opening of those plates the circuit from the battery through those magnets will be opened and pendulum-bar 20 will be released so its upper end will swing over toward the core of electro-magnet 17.

The opening of this circuit is but for the instant consumed by the automobile passing the highway element after which the circuit is again closed but the electro-magnets are deenergized for a lesser period than is consumed by the pendulum-bar 20 swinging away from the magnet 16 toward the magnet 17, consequently as the bar 20 approaches the core of magnet 17, the latter will have again become energized so as to attract and hold the bar 20 with contact 22 engaging contact-bar 19 and the apparatus will then be in the position illustrated in Fig. 3 of the drawings.

By referring to Fig. 3, it will be noted that the normal ignition circuit from battery 11 to distributer 12, is interrupted, because contact-bar 18 and contact plate 21 on the pendulum-bar 20 are separated, consequently firing in the cylinders of the motor will stop unless a substitute ignition circuit be provided while the pendulum-bar 20 is held by magnet 17.

A substitute ignition circuit, however, cannot be formed until the speed of the automobile is reduced to a predetermined low speed, consequently, in this instance, there can be no further firing of the charge in any of the motor-cylinders until the speed is reduced to that predetermined speed.

The reason for this is, that the substitute ignition circuit can only be formed through the speed governor 31, but it can only be formed through this speed governor after the speed has been reduced to the predetermined lower speed, at which low speed the governor will act as a switch to close the substitute ignition-circuit.

By again referring to Figs. 2 and 3 of the drawings, it will be noted that the speed switch or governer 31, has a movable contact element 49 and a stationary contact element 50,—the movable element traveling in a direction away from the stationary element 50 as the speed is increased beyond the predetermined low speed point, but moving back toward the stationary element 50 as the speed is decreased.

When the speed is at or below the maximum low speed point,—say from fifteen miles per hour to zero, then the movable contact 49 will engage the stationary contact 50 and by such engagement, close the low speed ignition circuit.

To accomplish this, I provide a wire 51 from the wire 37 to the movable contact 49, and I provide another wire 52 from the stationary contact to the wire 40 that leads to the distributer 12, consequently as long as the speed is in excess or above the predetermined low speed the movable contact 49 will be disengaged from the stationary contact 50 as in Fig. 2, and a substitute ignition circuit to the motor cannot be formed as long as pendulum-bar 20 is closed with contact bar 19, consequently the firing at the motor stops until the speed is cut down.

When, however, the speed has been reduced to the predetermined low speed, the movable contact 49 will engage the stationary contact 50, and immediately this engagement takes place, the substitute circuit will be formed and firing at the cylinders will take place, but only so long as the low speed is maintained.

Instead of depending on the motor as the means for controlling the automobile and its speed, I prefer to provide some means that will reduce the speed such as an application of the brakes on the automobile.

To this end, I show the speed governor 31 as having a second movable contact 53, and a second stationary contact 54. These two contacts 53 and 54 are electrically separated from the two contacts 49 and 50 hereinbefore referred to, but the movable contact 53 is so positioned and mounted that it will move as contact 49 moves and will engage the stationary contact 54 at all speeds over the predetermined low speed but will disengage said stationary contact 54 during all speeds under the predetermined low speed.

These two contacts 53 and 54 may be termed high speed contacts to distinguish them readily from the two low speed contacts 49—50.

From the high-speed contact 53, I provide a wire connection 55 to the contact-bar 19 of the selective relay and from the high speed contact 54, I provide another wire 56 which connects with the solenoid $a$, of the brake mechanism.

From the wire 56, I run a wire 57 to a rear signal lamp 34[1] and from the said signal lamp there is a ground wire connection 58[1].

All of these connections 53—54—55—56—57 and 58, may be regarded as back-contacts for the pendulum-bar 20, for when that bar is released by magnet 16, when approaching a danger zone, it is swung over to and held by magnet 17, while the automobile is passing through that danger zone and if the speed upon entering that zone is above the predetermined low speed, the moment pendulum-bar 20 swings over to magnet 19, a circuit is formed which actuates the solenoid, a, and applies the brakes until the speed is reduced to the predetermined speed whereupon the solenoid circuit will be interrupted and the substitute ignition circuit formed through the low speed contacts 49—50 to the motor.

The solenoid circuit at speeds above the low speed in a danger zone will be as follows:

From battery 11, by wires 36 to and through ignition switch 32, then by wires 37—38 to bearing-bracket 23 and through pendulum-bar 20 to back contact-bar 19, then by wire 55 to dash lamp 34 and ground 58 and also to movable high-speed contact 53, then through high-speed stationary contact 54 to and through wire 56 to the solenoid, which will operate the brake and from the wire 56, by wire 57 to lamp 34[1] and wire 58[1] to ground and back to battery.

Thus at high speed when entering a danger zone, the solenoid circuit will be formed and the brakes applied to control the automobile until the speed is reduced to a predetermined low speed, whereupon the brakes will be released and the substitute low speed ignition circuit will be formed while the automobile is traveling through said danger zone.

Attention is now directed to Figs. 1–4 and 5 of the drawings in order that a brief explanation of the highway elements may be set forth, it being understood however that the highway elements are not herein specifically claimed but are to form the subject of a separate application for patent.

At or beneath the surface of the highway 59, I locate a magnet. I have learned that these magnets may be installed in various ways in the highway, but in the present instance and as shown in Fig. 5, I have located the magnets 60 and 61 on opposite sides of a railway crossing 62 which intersects the highway.

These highway magnets in this instance are presumed to be permanent magnets with the north poles of the magnet bars 63 all located at one end and the south poles all located at the opposite end of the magnet structure.

I prefer to arrange these magnet bars 63, with one end lower than the other with respect to the highway surface although this is not actually necessary.

It is to be understood that these bars are parallel and extend in a direction lengthwise of the highway 59 and it is also to be understood that in the case of permanent magnets, there is absolutely no mechanical or electrical connection between the set of magnet-bars 60 on one side of the intersecting road 62 and the set of magnet bars 61 on the other side of the said intersecting road.

It is also to be understood that instead of being an intersection between a highway and a railroad, the magnets 60—61 may be located at the entrance and exits of a village or hamlet, or at dangerous curves or cross roads.

Presuming an automobile to be traveling from left to right on the highway 59 in Fig. 5, immediately upon passing over magnet 60, the north poles or higher ends of the magnet bars will attract the south pole ends of the magnetic needle-bar 27 of the breaker device, and thus oscillate the needle-bars, open contacts 28—29 and momentarily deenergize electro-magnets 16—17 on the automobile.

This operation releases pendulum-bar 20 from magnet 16 and opens the normal ignition circuit at 18—21. The pendulum-bar then swings over toward magnet 17, and while making this movement the magnets become energized again as soon as contacts 28—29 on the breaker close. Consequently, when pendulum-bar 20 approaches the energized magnet 17, the latter attracts and holds it, thereby closing the contact 22 with the bar 19, in readiness to complete a substitute ignition circuit as soon as the speed is reduced. or if the speed has been reduced, because of roadway warning signs, the substitute circuit will immediately be formed through the speed switch contacts 49—50.

If the speed has not been reduced however, the solenoid will be operated and the brakes applied until the speed is reduced and then the solenoid circuit will be interrupted through the opening of high-speed contacts 53—54.

The low speed ignition circuit will be maintained until the normal ignition circuit is restored.

The restoration of the normal ignition circuit is effected when the automobile passes over the reset magnet 61 because when this occurs the magnetic needle device 27, will again be actuated,—the electro-magnets 16—17 will again be momentarily deenergized and the pendulum-bar 20 will swing back and be held by electro-magnet 16 so as to automatically restore the normal ignition circuit and permit the automobile to be operated at high or low speed without hindrance.

It will thus be seen that the operation is entirely automatic both as to setting and resetting of the apparatus.

It will further be noted that immediately the ignition circuit is interrupted and the pendulum bar 20 swings over to contact bar 19, the dash lamp 34 is ignited and the operator at once notified that his ignition has been cut off because of high speed at a dangerous place.

Having described my invention, I claim,—

1. In a system for automatically controlling the speed of automobiles on trackless highways having constantly-energized magnet mechanisms located at dangerous places along such highway, the combination with a motor on the automobile, of a normal ignition circuit on the automobile to the motor, a magnetically-controlled switch in said normal circuit, an impulse circuit-breaker device also on the automobile which is operated when the automobile passes over each highway magnet and a circuit on the automobile including the said impulse circuit-breaker and the magnet of the magnetically-controlled switch whereby to hold the latter to maintain the normal ignition circuit and to deenergize said magnet and interrupt the ignition circuit upon passing over each highway magnet.

2. In a system for automatically controlling the speed of automobiles on trackless highways having constantly-energized magnet mechanisms located at dangerous places along such highway, the combination with a motor on the automobile, of a normal ignition circuit on the automobile to the motor, a magnetically-controlled switch in said normal circuit, a speed switch also on the automobile having a low speed circuit connection with the normal ignition circuit, a normally-open circuit connection between the speed switch and the magnetically-controlled switch, an impulse circuit-breaker device also on the automobile which is operated as the automobile passes over each highway magnet, a circuit also on the automobile including the said impulse circuit-breaker and the magnet of the magnetically-controlled switch to hold the latter and maintain the normal ignition circuit and to open said latter switch when passing over a magnet and permit the circuit through the low speed connection to the motor to be formed when the automobile speed is reduced to a predetermined point.

3. In a system for automatically controlling the speed of automobiles within constant danger zones on a trackless highway said system including a continuously effective magnet mechanism located on the highway and guarding the approach to the constant danger zone and another continuously effective magnet mechanism also on the highway at a point where it is desired to release the automobile from automatic control said spaced magnet mechanisms being separate and independent of each other, the combination with a motor on the automobile, of a normal ignition circuit also on the automobile to the motor, a magnetically-controlled switch in said normal circuit, an impulse circuit-breaker device also on the automobile which is operated when the automobile passes over each magnet at the approach to a danger zone, a circuit on the automobile including the said impulse circuit-breaker and a magnet of the magnetically-controlled switch to normally maintain said switch to keep the ignition switch closed, said impulse circuit being interrupted as the breaker device passes over the magnet at the entrance to a danger zone, means to provide a low speed ignition circuit for the motor while the automobile is moving through the danger zone to the next magnet when the circuit-breaker will again be operated and means whereby the magnetically-controlled switch will be restored to its normal position upon the second operation of the breaker device.

4. In a system for automatically controlling the speed of automobiles on trackless highways having constantly-energized magnet mechanisms located at the entrance to a danger zone along the highway and also at such places for each zone where the automobile is to be freed from control, the combination with a motor on the automobile, of a normal ignition circuit on the automobile to the motor, a pendulum relay included in said normal circuit when the pendulum is in one position, a low speed switch having a normal open connection with the ignition circuit, means for forming a low speed ignition circuit through the speed switch and pendulum when the latter is in its other position and an impulse breaker device on the automobile actuated each time the automobile passes a magnet to control the movement of the pendulum switch.

5. In a system for automatically controlling the speed of automobiles on trackless highways having constantly-energized magnet mechanisms located at the entrance to a danger zone along the highway and also at such places for each zone where the automobile is to be freed from control, the combination with a motor on the automobile, of a normal ignition circuit on the automobile to the motor, a speed switch including a stationary and a movable contact which are engaged only when the automobile is traveling at a low speed, a relay on the automobile having two contacts and a bar movable between them,—one of said contacts having connection with and being included in the normal ignition circuit and the other contact being connected to the speed switch, actuating means on the automobile which is operated each time a highway magnet is passed and means extending between said actuating means and the relay to cause a movement of the pendulum each time a highway magnet is passed to move the pendulum from one contact to the other.

In testimony whereof I affix my signature.

CHARLES ADLER, Jr.